Figure 1:
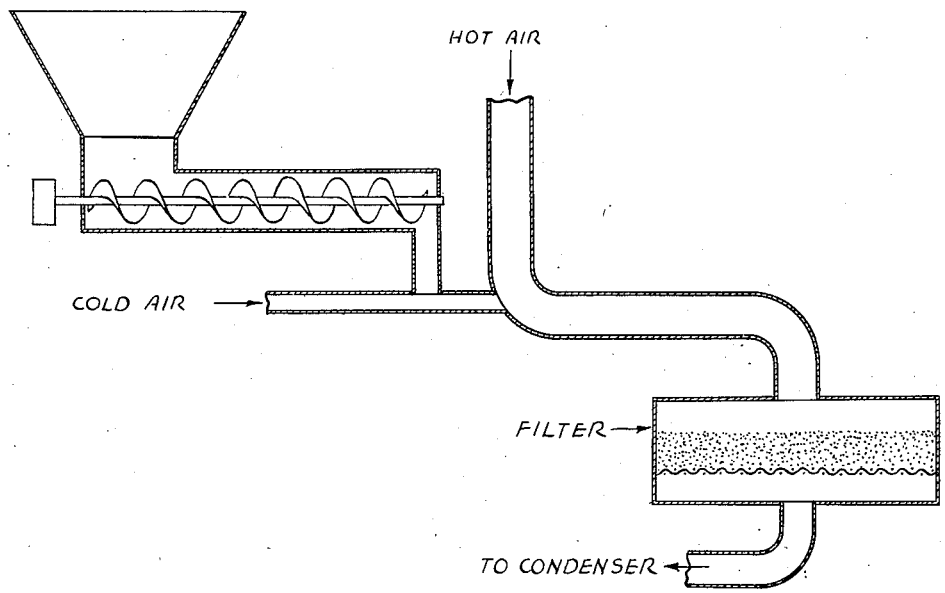
Figure 2:
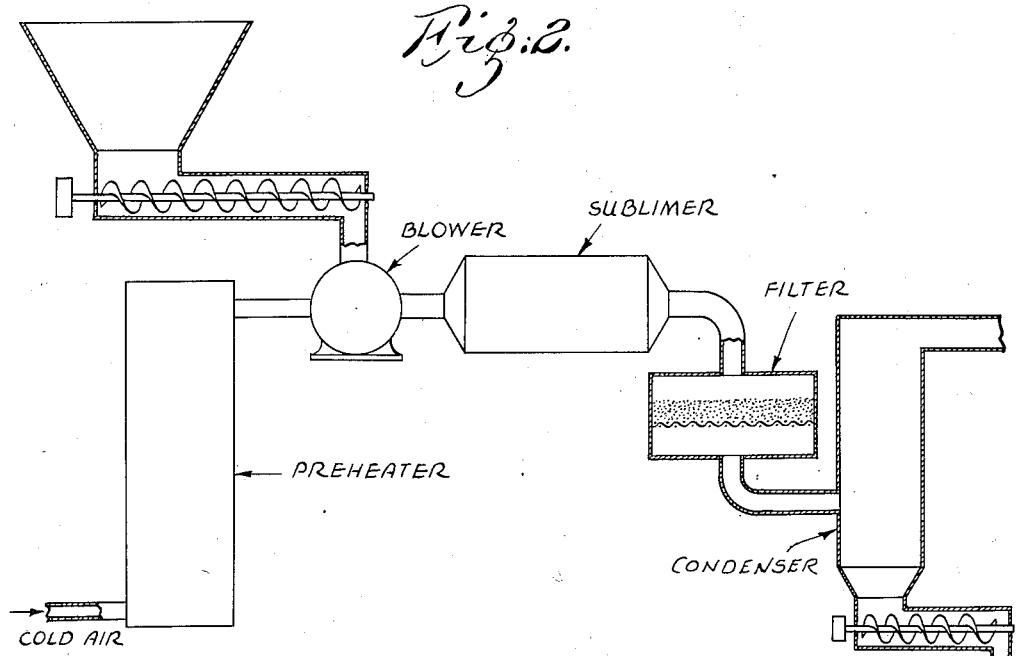

Jan. 8, 1935.　　　　　F. COMTE　　　　　1,987,282

METHOD OF PURIFICATION BY SUBLIMATION

Filed Aug. 29, 1931　　　2 Sheets-Sheet 1

INVENTOR
FREDERICK COMTE
By Joseph R. Mare
ATTORNEY.

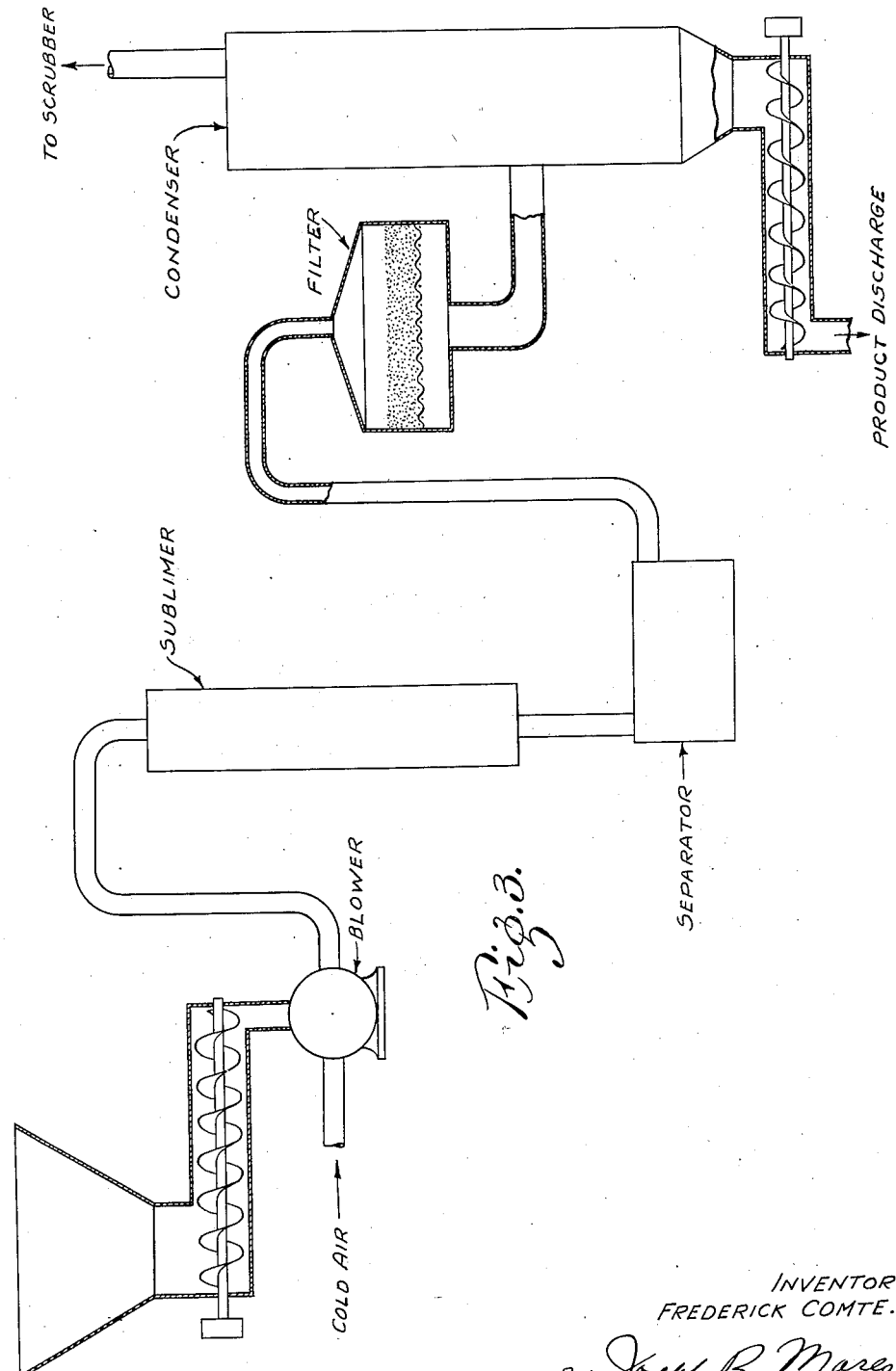

Patented Jan. 8, 1935

1,987,282

UNITED STATES PATENT OFFICE 1,987,282

METHOD OF PURIFICATION BY SUBLIMATION

Frederick Comte, Webster Groves, Mo., assignor, by mesne assignments, to Monsanto Chemical Company, a corporation of Delaware Application August 29, 1931, Serial No. 560,151

7 Claims. (Cl. 260—111)

This invention relates to the refining or purification of volatilizable organic compounds which are solid at ordinary temperatures, and it is peculiarly adapted to the refining of volatilizable organic compositions which suffer decomposition when exposed to elevated temperatures.

According to the present invention, the crude material to be purified is reduced to a granular or preferably pulverulent state after which it is admixed with a current of inert gas and sublimed. The impurities present are for the most part of a relatively non-volatile character and are, therefore, separated conveniently from the vaporous mixture, after which the gas is cooled whereby the sublimate is condensed. The gaseous mixture may be treated further to recover any residual uncondensed product, as by subjecting the same to a scrubbing operation or, if desired, may be recirculated through the system.

A better understanding of the principles of the invention and manner of practicing same may be had by referring to the accompanying drawings, which are more or less diagrammatic in nature, of equipment that may be employed advantageously and the description hereinafter set forth that is specifically related thereto.

Figure I is a sectional view of one embodiment of an apparatus which may be preferred in practicing the principles of the present invention;

Figure II is likewise an elevational sectional view, partly in section, of an apparatus similar to that illustrated in Figure I, differing however in that it embodies certain features not disclosed in Figure I; and Figure III is likewise an elevational view, partly sectional, of an apparatus similar to that illustrated in Figures I and II and embodying features not disclosed in either of the other embodiments.

According to Figure I there is provided a screw feed mechanism adapted to supply the crude pulverulent organic material to a jet of cold air which forms a suspension or cloud of the organic material before being admixed with a quantity of relatively hot air. Upon admixture with the hot air, the product is sublimed almost instantly, leaving suspended, however, the relatively non-volatile impurities, notably, those of a tar-like character. The sublimed mixture is then passed through a filter bed formed of inert material, the composition of which is determined by the character of the material undergoing treatment. For most purposes a sand filter will be found suitable. The finely divided solid suspended matter is deposited upon the filter medium whereas the clean filtered gaseous mixture is conducted to a condenser wherein the sublimed product is caused to separate.

The proportions of cold air and hot air as well as the temperatures of the two streams of air are adjusted and controlled to afford sufficient heat to sublime the product without exposing the same to an unnecessarily high temperature.

In Figure II there is disclosed a crude product feed mechanism similar to that set forth in Figure I. The material is supplied to a blower in which it is mixed thoroughly with air which has been preheated in a suitable preheating mechanism. The resulting mixture is conducted into a jacketed subliming chamber wherein the product is sublimed under controlled temperature conditions, after which the impurities are separated in a filter which may be similar to that disclosed in Figure I. Thereafter the purified product is separated by cooling and is withdrawn from the cooling or condensing mechanism in any desired manner as for example with the aid of a screw feed discharge.

In some cases, the sublimer will be found unnecessary inasmuch as sufficient heat may be supplied to effect the sublimation by means of the preheater. However, more flexibility in operation as well as other advantages are afforded by interposing a sublimer as indicated. The sublimer may consist of a large internally baffled drum which is jacketed and heated by means of steam or other heating fluid. Alternatively, the sublimer may consist of a plurality of tubes through which or around which the gaseous mixture is caused to circulate. In either case, one surface of the tubes is in contact with a heat supplying medium.

The exhaust gases from the condenser may be scrubbed of any residual product which may be either in vapor phase or in a finely divided solid form. Alternatively, the exhaust gases may be introduced into the preheater and recirculated through the system.

The raw material supplied to the blower may be introduced on the intake side or, if desired, on the pressure side of the blower. For this purpose any suitable feeding device other than the screw feed illustrated may be employed.

In lieu of the screw feed mechanism for introducing the pulverulent crude material into a stream of air, one may operate a pulverizer having an air classifying unit which is adapted to discharge its suspended product directly to the subliming equipment and thereby eliminate the necessity of collecting the pulverulent material and feeding the same in the manner aforedescribed.

The sublimer is constructed advantageously of a plurality of tubes through which the suspension is blown. The tubes are surrounded by a heating fluid, such for example as steam, maintained at a predetermined pressure to afford the necessary temperature differential required to effect sublimation.

From time to time the sublimer is freed of accumulated solids either by mechanically scraping the surfaces thereof or preferably by means of a solvent. Usually hot water or an aqueous solution of soda ash or lye will be found effective.

In some instances, the separator will be found to be unnecessary and sublimed product discharged from the sublimer may be conducted directly to the filter. However, to avoid overloading the filter and assure continuity of the operation without the necessity of frequent renewal of the filter bed, it is convenient to introduce a separating chamber to remove the larger particles. Any separating device may be employed for this purpose, which can be maintained at a sufficiently elevated temperature to eliminate danger of precipitation. A lagged or jacketed cyclone separator will be found to function satisfactorily.

The construction of the filter may be varied within a wide range and may include various filtering media, such as mineral wool, asbestos fragments, washed quartz sand, charcoal, pumice, kieselguhr, metal shavings, fabrics, etc., depending upon the nature of the material undergoing treatment. In general, material having adsorptive properties are to be preferred either alone or in combination with inert fragments. A reduction in the size of fragments forming the filter bed in the direction of flow of the vapors prolongs the life of the filter.

The condensation operation in and of itself may follow conventional practice. A convenient form consists of a large chamber, the surface of which is maintained at a predetermined temperature to effect the desired cooling. Several condensers may be employed in series. If desired, the exhaust gases may be scrubbed or otherwise treated to remove the traces of product before discharging the same to the atmosphere.

In the application of this invention to the refining of most crude materials, air will be found suitable; however, inert gases may be substituted, such as, nitrogen, carbon dioxide, washed furnace gases, etc.

All equipment containing gases at elevated temperatures prior to the condensation should be lagged or preferably jacketed to avoid excessive losses of heat. Similarly, the filtering medium may include heating means such, for example, as a steam coil to eliminate the possibility of precipitation of the product therein.

It is to be understood, of course, that the temperature of the gases and concentration of the material undergoing purification in said gases may be varied within a wide range to meet the requirements of any specific material undergoing purification. The materials of construction should be selected in view of the product undergoing treatment and known to withstand the action of such organic chemical products. In practice I have found that the sublimation is effected almost instantaneously and the product undergoing treatment remains in the system but a very short period of time. In this respect it differs markedly from present day purification processes involving sublimation.

From the foregoing description, the application of the general principles of the present invention will be readily apparent to those skilled in the art. The following example will serve to illustrate the process as applied to salicylic acid.

The usual method of purifying salicylic acid consists in conducting heated air over solid salicylic acid or by passing air over a pool of molten salicylic acid to effect the sublimation. In either case, large quantities of air are necessary. Moreover, inasmuch as the crude material is subjected to an elevated temperature for an extended period of time considerable decomposition and phenol formation ensues resulting in a reduction in yield.

These disadvantages are overcome and a product of good quality is obtainable while at the same time the amount of air necessary is reduced substantially by subliming a suspension of crude salicylic acid in an inert gas such as air. Moreover one is enabled to obtain a larger and denser crystalline product probably due to the fact that a higher concentration of salicylic acid in air is possible.

In applying this invention to the purification of salicylic acid, pulverulent dry salicylic acid is supplied to the intake side of a blower at the rate of four tenths (.4) pound per minute, the capacity of the blower being approximately 65 cubic feet of air per minute. The suspension of salicylic acid is preheated by conducting the same through a tubular preheater which is supplied with steam at 50 pounds pressure. The temperature of the suspension is raised thereby to approximately 130° C. At this temperature the salicylic acid remains substantially unsublimed. Thereafter the preheated suspension is conducted through a sublimer consisting of a plurality of tubes heated by steam at 150 pounds pressure. The salicylic acid is sublimed and the mixture thereof with air is discharged at approximately 170° C. After passing through a separator consisting of a lagged chamber to remove large suspended particles, it is filtered. A granular mineral filter bed 6-12 inches deep and 3 feet in diameter will be found adequate. The filtered vapors are then conducted through a lagged line into a condensing chamber of conventional construction where the product is deposited. The cooled gases discharging from the condenser are conducted through a scrubbing tower, the scrubbing fluid consisting of an aqueous solution of soda ash.

The physical characteristics of the product obtained can be modified by adjusting the rate of condensation. It is possible by cooling the vapors slowly to obtain large clear crystals that are distinct from present day sublimed salicylic acid products which are of extremely fine needle-like texture, having a low apparent specific gravity.

Although several embodiments of the invention have been illustrated and described and one specific example of applying the invention has been set forth, it will be apparent to those skilled in the art that the invention is applicable to the purification of a wide variety of organic compounds which are solid under ordinary conditions and which may be volatilized without decomposition, and further that the invention contemplates broadly the formation of a cloud of suspended crude material undergoing purification followed by a rapid sublimation, filtration and condensation.

What I claim is:

1. A method of vaporizing sublimable pulverulent material which comprises disseminating the entire mass as a cloud-like suspension in an inert gaseous medium and then heating the medium to effect substantially instantaneous vaporization, of the entire mass.

2. The method of vaporizing sublimable pulverulent material which comprises admixing the entire mass of material with an inert gaseous medium to form a cloud-like suspension at a temperature below that at which substantial sublimation takes place and then admixing the suspension with additional inert gaseous medium which is heated to a temperature adequate to effect sublimation.

3. The method of vaporizing sublimable pulverulent material which comprises admixing the entire mass of material with an inert gaseous medium to form a cloud-like suspension at a temperature below that at which substantial sublimation takes place and then contacting the material with a surface heated to a temperature sufficient to effect volatilization.

4. The method of vaporizing salicylic acid material which comprises admixing the entire mass of material with an inert gaseous medium to form a cloud-like suspension at a temperature below that at which substantial sublimation takes place and then admixing the suspension with additional inert gaseous medium which is heated to a temperature adequate to effect sublimation.

5. The method of vaporizing salicylic acid material which comprises admixing the entire mass of material with an inert gaseous medium to form a cloud-like suspension at a temperature below that at which substantial sublimation takes place and then contacting the material with a surface heated to a temperature sufficient to effect volatilization.

6. A method of purifying sublimable pulverulent material containing a relatively less volatile material as an impurity, which comprises forming the pulverulent material into a suspension in an inert gaseous medium, effecting volatilization by sublimation of the sublimable material while carrying the impurities in suspension in the gaseous medium, conducting the suspension beyond the zone of sublimation, removing the suspended impurities and condensing the sublimed material.

7. A method of purifying sublimable pulverulent material containing a relatively less volatile material as an impurity which comprises forming the whole mass of pulverulent material into a cloud-like suspension in an inert gaseous medium, effecting volatilization by sublimation of the sublimable material while carrying the impurities in suspension in the gaseous medium, conducting the medium containing the suspended impurities beyond the zone of sublimation, removing the suspended impurities from the gaseous medium and effecting condensation of the sublimed material.

FREDERICK COMTE.